United States Patent [19]

Evenson

[11] Patent Number: 4,757,602

[45] Date of Patent: Jul. 19, 1988

[54] METHOD FOR INSTALLING A COLLECTOR RING ASSEMBLY

[75] Inventor: Rickie A. Evenson, Ham Lake, Minn.

[73] Assignee: Onan Corporation, Minneapolis, Minn.

[21] Appl. No.: 22,781

[22] Filed: Mar. 6, 1987

[51] Int. Cl.⁴ ............... H01R 43/06; H01R 43/10; H02K 15/02

[52] U.S. Cl. ...................... 29/597; 29/598; 29/856; 310/71; 310/232; 310/234; 439/398; 439/818; 439/926

[58] Field of Search ............ 29/597, 598, 854–858, 29/861, 866; 310/42, 232, 234, 71; 439/392, 398, 818, 926

[56] References Cited

U.S. PATENT DOCUMENTS

| | | | |
|---|---|---|---|
| 3,603,825 | 9/1976 | Sheridan et al. | 310/234 X |
| 4,584,498 | 4/1986 | Strobl | 310/71 X |
| 4,628,592 | 12/1986 | Mahon | 29/596 |

Primary Examiner—Carl E. Hall
Attorney, Agent, or Firm—Merchant, Gould, Smith, Edell, Welter & Schmidt

[57] ABSTRACT

A collector ring installation and lead terminating assembly comprising cooperating terminals (40,40'), poke-in terminals (60,60'), and collector ring leads (50,50') for forming an electrical connection between a collector ring assembly (30) and a rotor winding of a rotor (10).

6 Claims, 2 Drawing Sheets

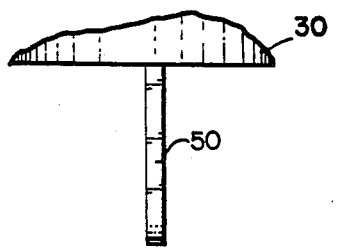
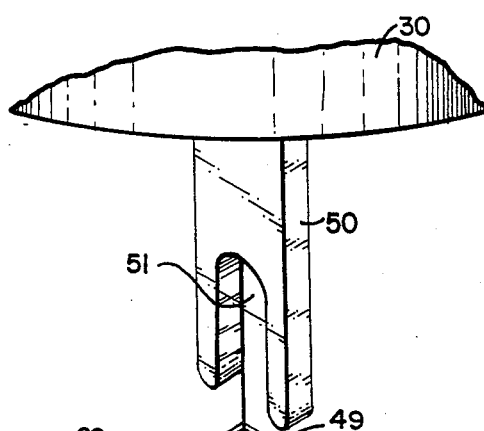
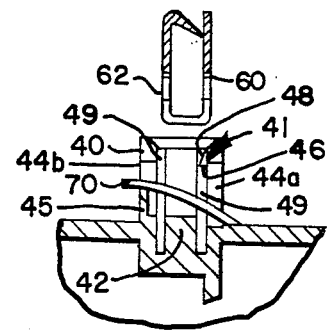
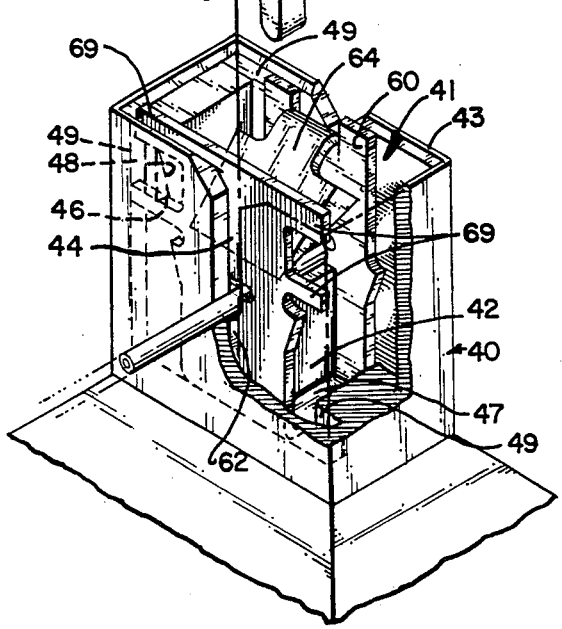
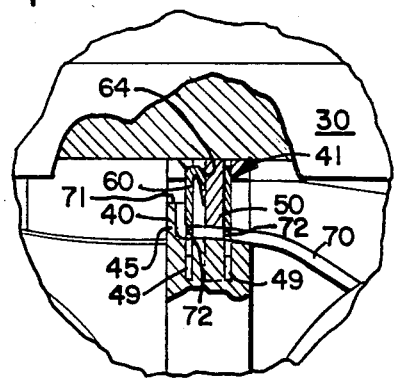

METHOD FOR INSTALLING A COLLECTOR RING ASSEMBLY

BACKGROUND OF THE INVENTION

This invention relates to the field of electrical motors and generators, and particularly to a method and apparatus for simultaneously installing a collector ring on a rotor shaft and electrically interconnecting the rotor windings to the collector ring.

The typical electric motor is comprised of a rotor shaft, a rotor having field windings, rotor end caps, and a collector ring. The rotor end caps and collector ring are aligned on the shaft such that the collector ring rotates with the rotor and so that the rotor windings are in electrical contact with the collector ring. Instead of collector rings, commutators may also be used to make connection with the rotor windings.

Prior methods of installing collector rings or commutators require separate acts to both electrically connect the ring or commutator with the rotor windings and structurally connect the rotor to the ring or commutator. Such steps increase the time, effort, and cost of installing collector rings and commutators.

Prior methods frequently require soldering or welding, which involve heat. Heating may damage components of the rotor, resulting in a high rejection rate and high costs. Furthermore, such heating may require the use of more expensive molding materials necessary to withstand the high temperatures created by these steps.

The typical method of and apparatus for installing and connecting the commutator often requires machining the ends of the rotor windings. This step also generates heat and adds to the time and cost of the installation and connection.

Collector ring and commutator installation systems require that the ends of the rotor windings be stripped of their insulating film. This step further increases the costs of installing and connecting the collector ring, introduces additional opportunities for manufacturing flaws, and reduces reliability in previous installation systems.

Previous systems also involve such components as connecting strips and materials such as solder. Elimination of these additional parts and materials from the installation/connection process would further reduce costs and increase reliability.

Previous installation and connection systems resulted in electrical connections which are exposed to the air and environment, resulting in significant and frequent damage to and failure of the electrical connections.

It is further desirable to provide a method for installing and connecting collector rings which may be easily automated in as few steps as possible.

The present invention overcomes these problems and other problems associated with existing systems and methods.

SUMMARY OF THE INVENTION

Disclosed herein is a collector ring installation and lead terminating assembly comprising a means for forming an electrical connection between the collector ring and rotor winding simultaneously with the structural connection of the collector ring to the rotor. The assembly includes a collector ring having a collector ring lead, a receiving means (also called a terminal cavity) mounted on the rotor end cap, and a poke-in terminal which receives the collector ring lead and which is inserted into the rotor end cap terminal cavity. In use, an end of the rotor winding is inserted into the rotor end cap terminal cavity. The poke-in terminal is also inserted into the terminal cavity so that it contacts the ends of the rotor windings. The poke-in terminals displace the magnet wire insulation and establish electrical contact as they are inserted into the terminal cavities.

The system thus connects the collector ring to the rotor end cap simultaneously with the formation of an electrical contact between the ring and rotor windings, without the use of additional steps such as soldering or machining the magnet wire leads. The apparatus also eliminates the need for separate steps to strip the insulation from the rotor windings or to create a secure electrical contact between the rotor windings and collector ring. Furthermore, the terminal cavity may be filled with an insulating resin to create an airtight, protective electrical contact. Further advantages and features of the invention are pointed out in the accompanying description of the invention, drawings, and claims.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein corresponding reference numerals indicate corresponding parts throughout the several views.

FIG. 2 is an enlarged partial sectional view of the collector ring installation system shown in FIG. 1 immediately before installation and electrical contact are completed;

FIG. 3 is an enlarged partial view, with portions broken away, of the collector ring installation system immediately after the poke-in terminal and magnet wire are inserted into the terminal cavity and before the collector ring lead is inserted into the cavity;

FIG. 4 is an enlarged partial side view of the collector ring installation stystem immediately after installation and connection are completed.

DETAILED DESCRIPTION OF THE INVENTION

Figure 1:
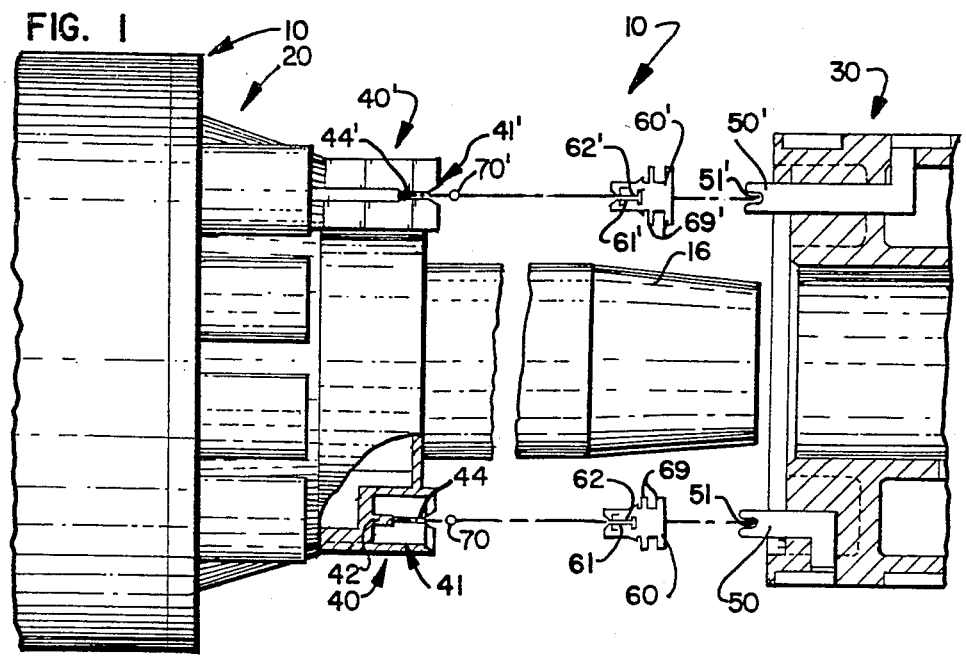
FIG. 1 is a side view, with portions broken away, of an embodiment of a collector ring installation and electrical contact system in accordance with the principles of the present invention.

FIG. 1 shows a rotor 10 including a rotor shaft 16. A rotor end cap 20 is mounted on the end of the rotor 10 for rotation therewith. A second end cap may be fitted onto the other end of the rotor, but is not shown in FIG. 1.

The rotor end cap 20 has mounted thereon receiving means such as terminals 40 and 40' similarly configured as a generally rectangular plastic box and defining rectangular cavities 41,41' and each having a pair of aligned slots 44 and 44' on opposing walls 43 and 43', respectively, capable of receiving wires. It should be noted that the invention herein is not limited to any particular number of terminals, and descriptions herein of one terminal apply to the other terminal or terminals used as well. Corresponding parts of the other terminal or terminals are designated by primed reference numerals.

Referring to the terminal 40 shown in FIGS. 2-5, an anvil structure 42 extending upward from a bottom surface 47 is aligned with the slots 44 in the cavity 41 to hold a rotor winding wire, also called a magnet wire, in place within the cavity 41 off the bottom surface 47. In the embodiment shown, the slots 44 have varying length as is generally illustrated in FIG. 2. Slot 44a has a longer length than slot 44b.

The rotor winding wire may have a first end portion 70 which is inserted into and through the cavity 41 of the terminal 40 and a second end portion 70' which is inserted into and through the cavity 41' of the terminal 40'. Electrically conducting poke-in terminals 60 and 60' are correspondingly configured and positioned with respect to the terminal cavities 41 and 41', respectively, such that slots 62 and 62' of the poke-in terminals will align with terminal slots 44 and 44' when the poke-in terminals 60 and 60' are inserted into the terminal cavities 41,41'. In the embodiment shown in FIGS. 2-5, the terminal cavity 41 has vertically extending grooves 49 disposed in its corners for receipt of horizontally projecting ear members 69 of the poke-in terminal 60 such that the ear members 69 slide in the grooves 49 as the poke-in terminal 60 is inserted into the cavity 41. In the embodiment shown, the terminal cavity 41 further includes an inclined surface 48 in the grooves providing a substantially flat shoulder portion 46 for at least one of the ear members 69 to engage. Accordingly, the poke-in terminals 60,60' will snap into place and be retained in the cavities 41,41'. The width along at least a portion 61 and 61' of the slots 62 and 62' is less than the total diameter of the rotor winding wire end portions 70 and 70' such that the insertion of the poke-in terminals 60 and 60' into the terminal cavities 41,41' results in displacement of insulation surrounding the rotor winding wire end portions 70 and 70' as the wire ends are forced into a narrower portion of the slots 62 and 62' to form an electrical contact with the terminals 60 and 60'. This is accomplished by forcing the narrow portions 61 and 61' of the slots 62 and 62' beyond the anvil structures 42 and 42' which prohibit further movement of the wire end portions 70 and 70'. Extraneous wire from the rotor wire winding end portions 70 and 70' may be removed prior to completely inserting the poke-in terminals 60 and 60' by trimming the ends 71 and 71'. Upon completely inserting the poke-in terminals 60 and 60', the wire ends 71 and 71' are tucked between the poke-in terminals 60 and 60' and portions 45 and 45' of the terminals 40 and 40' as is illustrated in FIG. 4 such that there are no extraneous wire ends projecting. It will be appreciated that the poke-in terminals 60 and 60' may be forced into the terminals 40 and 40' by any number of tools or mechanical processes.

The electrically conducting collector ring leads 50 and 50' are configured and positioned with the poke-in terminals 60 and 60' so that the rotor wire winding end portions 70 and 70' complete electrical connections with the ring leads 50 and 50' as the collector ring 30 is press-fitted onto the rotor shaft 16. The collector leads 50 and 50' include recesses 51 and 51' at their ends for straddling the anvil structures 42 and 42' in the cavities 41 and 41'. FIGS. 3 and 4 show the collector ring lead 50 immediately before and after insertion into the terminal cavity 41. The collector ring lead 50 is inserted and retained between resilient, spring-pressure contact member 64 and a metal wall 67 of the poke-in terminal 60 which opposes the contact member 64. Thus, the collector ring leads 50 and 50' are removably attached to the poke-in terminals 60 and 60'; however, the collector ring leads 50 and 50' may be permanently attached as well.

FIG. 4 shows the collector ring lead as installed in the poke-in terminal 60 and the terminal cavity 41. The poke-in terminal member 64 presses against the metal collector ring lead 50 to secure an electrical contact. The poke-in terminal 60 is inserted into the terminal cavity 41 such that the insulation on the rotor wire winding end portion 70 is displaced and an electrical contact between the wire and the poke-in terminal is formed as generally illustrated at 72 in FIGS. 4 and 5. The poke-in terminal 60 might also sever the end 71 of the rotor wire winding end portion 70 which extends beyond the terminal cavity 41 as the poke-in terminal 60 is inserted into the cavity 41. The portion 45 of the terminal cavity 41 which is in line with the slots 44b and 62 might be configured with an edge surface to cooperate with the poke-in terminal 60 to sever the rotor wire winding end portion 70. When the collector ring 30 is fitted onto the rotor end cap 20, the collector ring lead 50 simultaneously forms an electrical contact with the magnet end wire. Accordingly, both a structural interconnection and an electrical interconnection is established by fitting the collector ring 30 with its associated collector ring leads 50 onto the rotor end cap 20 and its associated terminals 40,40'.

Figure 5:
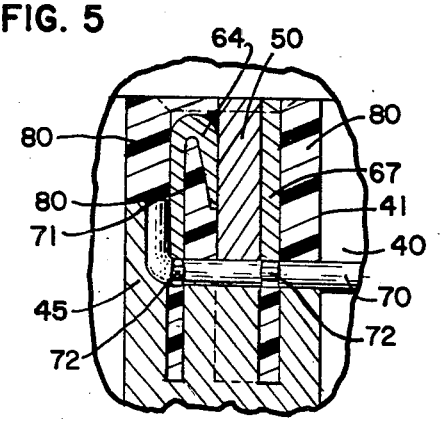
FIG. 5 is a view similar to FIG. 4 of an alternate embodiment, wherein the terminal cavity is filled with a resin.

As illustrated in FIG. 5, in an alternative embodiment of the invention, there is provided the additional step of filling the terminal cavity 41 with a protective resin 80. The resin 80 will protect the electrical interconnection from the air and environment.

Other embodiments of the invention, such as using more than two sets of terminal cavities 41,41' as may be necessary for series connection of rotor windings to the collector ring lead, may also be achieved with the invention as described.

It is to be understood that even though the above numerous characteristics and advantages of the invention have been set forth in the foregoing description, together with details of the structure and function of the invention, the disclosure is illustrative only, and changes may be made in detail, within the principles of the invention, to the full extent indicated by the broad general meaning of the terms in which the appended claims are expressed.

What is claimed is:

1. A method of installing a collector ring onto a rotor and terminating a collector ring lead comprising the steps of:
    (a) providing a rotor having a receiving means for receiving a collector ring lead, a rotor winding wire, and a terminal means;
    (b) inserting a rotor winding wire into the receiving means;
    (c) inserting a terminal means for electrically connecting a collector ring lead and the wire into said receiving means such that the terminal means electrically contacts the wire;
    (d) providing a collector ring having a collector ring lead structurally and electrically interconnected thereto; and (e) inserting the collector ring lead into the terminal means and the receiving means so that the collector ring lead makes electrical contact with the terminal means and the wire and the collector ring is structurally connected to the rotor.

2. A method in accordance with claim 1, wherein the step of providing a rotor comprises a rotor end cap having a slotted terminal receiving means mounted thereto, said terminal receiving means capable of receiving the wire end, a poke-in terminal, and the collector ring lead.

3. A method in accordance with claim 2, wherein the step of inserting a terminal means comprises inserting the poke-in terminal into the terminal receiving means such that an electrical connection between the poke-in terminal and the wire is formed.

4. A method in accordance with claim 3, wherein the step of providing a collector ring comprises pressing the collector ring into structural contact with the rotor end cap so that the collector ring lead electrically contacts the poke-in terminal and the wire in the slotted terminal receiving means.

5. A method of installing a collector ring onto a rotor and terminating a collector ring lead comprising the steps of:
(a) providing a rotor end cap having a slotted terminal receiving means mounted thereto, said terminal receiving means capable of receiving a wire, a poke-in terminal, and a collector ring lead;
(b) inserting a magnet wire into the terminal receiving means;
(c) inserting a poke-in terminal having a slot into the terminal receiving means;
(d) displacing the insulation of the magnet wire to form an electrical contact between the magnet wire, and the poke-in terminal; and
(e) inserting the collector ring lead into the terminal receiving means to form a structural and electrical interconnection between the rotor and the collector ring.

6. The method of claim 5, further comprising the step of inserting an insulating substance into the terminal receiving means so that the electrical contact between the collector ring lead, the poke-in terminal, and the magnet wire is insulated from the air and environment.

* * * * *